April 20, 1954  L. T. CONDE  2,675,821
MILKING MACHINE PULSATOR
Filed May 5, 1950  3 Sheets-Sheet 1
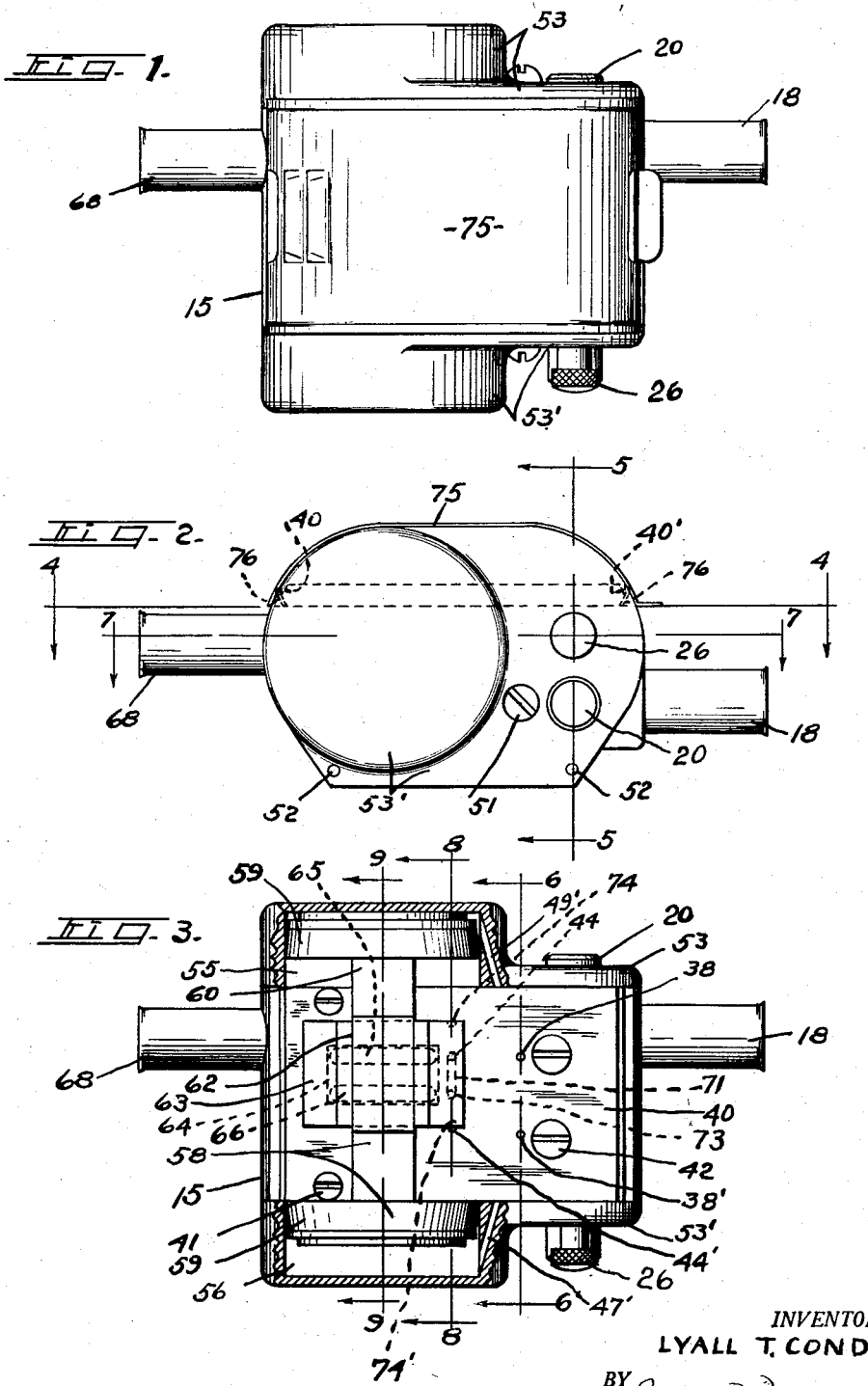
INVENTOR.
LYALL T. CONDE
BY John P. Murphy
Attorney April 20, 1954 L. T. CONDE 2,675,821
MILKING MACHINE PULSATOR
Filed May 5, 1950 3 Sheets-Sheet 2
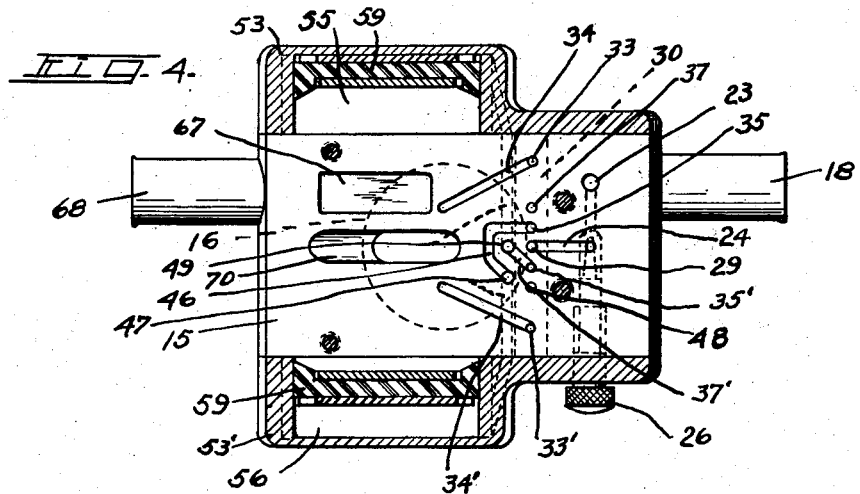
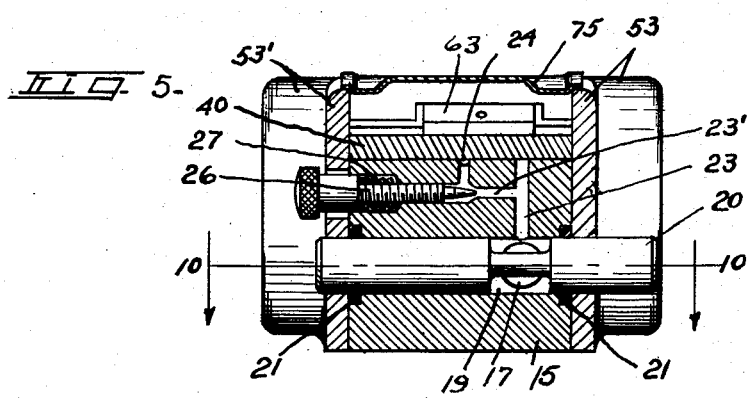
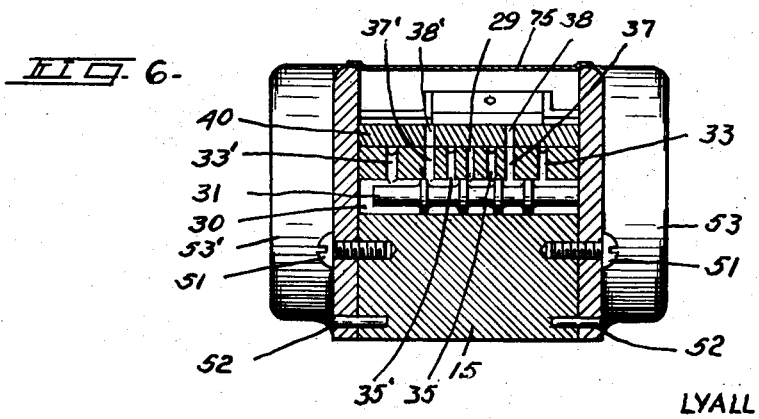
INVENTOR.
LYALL T. CONDE
BY John P. Murphy
Attorney

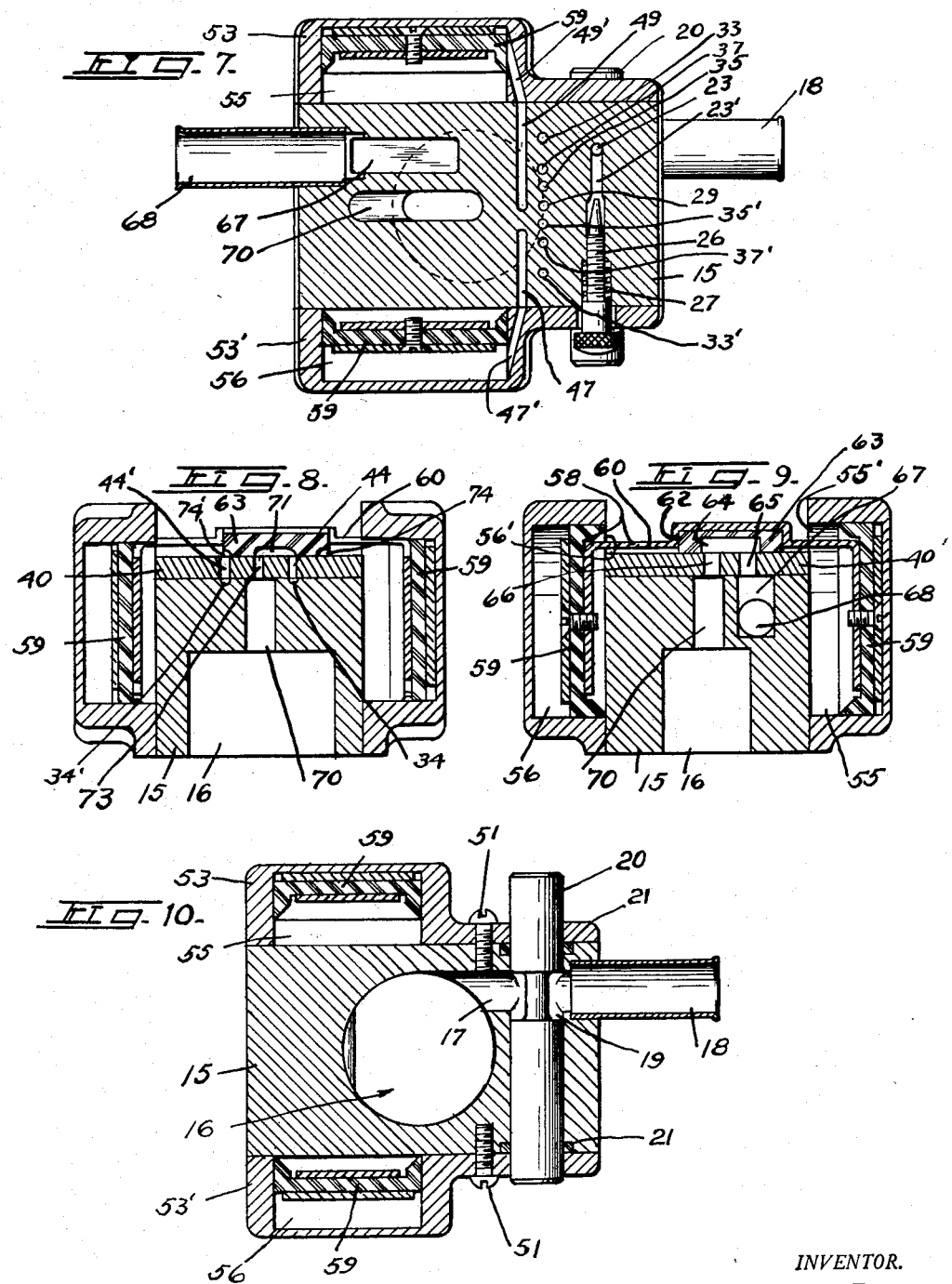

Patented Apr. 20, 1954

2,675,821

UNITED STATES PATENT OFFICE 2,675,821

MILKING MACHINE PULSATOR

Lyall T. Conde, Sherrill, N. Y.

Application May 5, 1950, Serial No. 160,288

1 Claim. (Cl. 137—103)

This invention relates to a milking machine pulsator of the character ordinarily employed for controlling the application of differential pressures to a set of teat cups, and relates more particularly to the valve mechanism and power means therefor used in a milking machine.

The primary object of this invention is to produce a pulsator of the above mentioned type which is simple and durable in construction, economical and efficient in operation, and which may be maintained in a clean sanitary condition with a minimum of time and labor.

In carrying out the objects of this invention, I have provided a manually operated control valve and an automatically operated pressure control valve, both of which are of the reciprocating piston or shuttle type which operate with a minimum amount of friction and wear, and a single block valve mechanism actuated by a duplex piston. The block valve mechanism is adapted to alternately connect the teat cups with a source of vacuum pressure and with the atmosphere, and also to alternately produce positive and vacuum pressure on the pressure controlled shuttle valve at a predetermined point thereof, to actuate said shuttle valve. One advantage of the manually operated control valve is that the operator can start and stop the pulsator without shutting off part of the vacuum line, and a further advantage of the valve lies in the fact that by closing the vacuum pressure in the pulsator the liquid milk is prevented from entering the vacuum line and producing an unsanitary condition therein, with resulting loss in efficiency. This shuttle valve is also adapted to alternately connect opposite ends of the duplex piston with the source of vacuum and with the atmosphere to effect movement in the block valve.

These and other objects and advantages will more fully appear from the following description taken in conjunction with the accompanying drawings in which:

Fig. 1 is a top plan view of a pulsator embodying the various features of this invention.

Fig. 2 is a side elevation of the pulsator shown in Fig. 1.

Fig. 3 is a top plan view of the pulsator with the cover removed, and with portions broken away and in section.

Fig. 4 is a horizontal sectional view taken substantially on line 4—4 of Fig. 2.

Fig. 5 is a vertical sectional view on line 5—5 of Fig. 2.

Fig. 6 is a vertical sectional view taken substantially in the plane of line 6—6 of Fig. 3.

Fig. 7 is a horizontal sectional view taken substantially on line 7—7 of Fig. 2.

Figs. 8 and 9 are vertical sectional views taken respectively on lines 8—8 and 9—9 of Fig. 3.

Fig. 10 is a horizontal sectional view taken on line 10—10 of Fig. 5.

The pulsator as shown in the drawings comprises a centrally located substantially rectangular body member 15 having a cylindrical discharge chamber 16 extending upwardly from the bottom thereof adapted to have communication with the interior of a milk pail (not shown) to which the pulsator is to be removably attached in any well known manner. Extending rearwardly from the chamber 16 through the body 15 is a bore or passage 17, having a nipple 18 at its outer end adapted to be connected by a hose (not shown) with a source of vacuum. A bore 19 of greater diameter than passage 17 extends transversely through the body 15 to intersect said passage. In the bore 19 is a shut off valve 20 of the reciprocating piston type which extends outwardly at both ends thereof beyond the body 15. Packings 21 may, as shown in Figs. 5 and 10, be employed for preventing entrance of air pressure between valve 20 and the wall of the bore 19. Packings 21 are also utilized for frictionally maintaining valve 20 in the adjusted position. Extending upwardly from bore 19, at the junction thereof with passage 17, is a passageway 23 which communicates at its upper end with a forwardly extending groove 24 provided in the upper flat surface of body 15 (see Figs. 4 and 5). Passageway 23 has the intermediate portion 23' thereof extending horizontally or substantially parallel with the bore 19, intermediate said bore and the upper face of the body 15.

A needle valve 26 screw-threaded in the body 15 co-acts with the portion 23' of passage 23 for regulating and controlling the speed of operation of the pulsator in a manner which will hereinafter more fully appear. A compression spring 27 may (as shown) be utilized for frictionally maintaining valve 26 in the adjusted position. The forward end of groove 24 is in communication with a vacuum port 29 which extends downwardly in communication with shuttle valve bore 30, substantially midway between the ends thereof (see Figs. 4 and 6). The bore 30 extends transversely of body member 15 in substantially parallel relation with bore 19. A shuttle valve 31 is mounted for free axial reciprocative movement in the bore 30, and is of less length than said bore to provide for the required movement of the valve. In addition to port 29, the shuttle valve bore 30 is provided with two shuttle valve control ports 33 and 33' adjacent respective ends of the shuttle valve for admitting differential pressures to the end of said shuttle valve 31; two piston control ports 35 and 35' positioned one at either side of port 29 in slightly spaced relation thereto, and a pair of atmospheric ports 37 and 37' spaced intermediate ports 33—35, and 33'—35'. All extend vertically from the bore 30 to the upper face of the body member 15. Ports 37 and 37' are in communication with ports 38 and 38' which extend upwardly through a cover plate 40, secured to the upper flat surface of body member 15 as by screws 41 and 42 to form a substantially fluid-tight connection with said body member. Ports 33 and 33' have the upper ends thereof communicating with grooves 34 and 34' respectively, formed in the upper face of the body member 15, and which extend forwardly beneath the cover plate 40 in converging planes into communication with a pair of vertical ports 44 and 44' respectively, formed in cover plate 40. Port 35 has the upper end thereof in communication with an angular groove 46 which communicates with one end of an L-shaped passage 47 which extends downwardly from the upper face of body 15 and then laterally to one side of said body. Likewise, port 35' is connected by a groove 48 with one end of a second L-shaped passage 49 which extends downwardly from the upper face of body 15 and then laterally to the side thereof opposite passage 47. Secured as by screws 51 and dowel pins 52, to the sides of the body 15 are side members 53 and 53', one at either side thereof. One of the side members as 53 has a fluid passage 49', which extends from the adjacent passage as 49 to the outer end of a cylinder shaped piston chamber 55 provided in said end member (see Fig. 7). Likewise, end member 53' has a cylindrical piston chamber 56 therein which has its outer end maintained in communication with passage 47 by a passage 47' in member 53'. Piston chambers 55 and 56 are arranged in substantially co-axial relation with each other for the reception of a duplex piston 58. Piston 58 comprises two piston heads 59 made of rubber impregnated with a lubricant. Piston heads 59 are connected by tie member 60 which arches over the intervening space above the cover plate 40 (see Fig. 9).

The tie member 60 is socketed in a groove 62 in a block slide valve 63 which is mounted for reciprocal movement on the cover plate 40 adjacent the forward end thereof. The under surface of valve 63 is provided with a rectangular recess 64 of suitable dimensions to span a pair of elongated transversely spaced recesses, 65 and 66, provided in cover plate 40. One of the recesses as 65 is in communication with a passage 67 which extends downwardly in the body member 15 and is in communication with a vacuum cup nipple 68 which may be operably connected by suitable tubing and claw member with the set of teat cups (not shown). The other recess 66 is maintained in communication with the discharge chamber 16 by a passageway 70 formed in body member 15. The block slide valve 63 is also provided in its under surface with an elongated groove 71 disposed transversely thereof at the rear of recess 64 and which is of sufficient length to connect a central port 73 provided in cover plate 40 in communication with recess 70 with one or the other of the two herein mentioned ports 44 and 44' (see Figs. 3 and 8). Furthermore, valve 63 is provided, at opposite sides thereof in alignment with groove 71, with ports 74 and 74' so spaced from each other and from groove 71 that when port 73 is connected with one of the ports as 44 by said groove 71 the other port as 44' will be maintained in communication with air at atmospheric pressure (see Fig. 8).

As best disclosed in Fig. 9, the piston chambers 55 and 56 are arranged to extend a short distance above the body member 15 and cover plate 40, and thus provide openings 55' and 56' through which the tie member 60 may pass as the duplex piston 58 is caused to reciprocate. In other words, the open inner adjacent ends of piston chambers 55 and 56 are only partially closed by the body member 15 and cover plate 40, and in order that a minimum amount of dirt, dust, and other foreign material may enter chambers 55 and 56 or into the various ports in plate 40, or be lodged beneath the valve 63, the pulsator has been provided with cover 75 provided with detents 76 at the front and rear ends thereof, adapted to have snap on and off engagement with the cover plate 40 which has the front and rear end walls thereof beveled as at 40' for this purpose.

It will now be understood that, when the shuttle valve 31 and block valve 63 are in the positions shown in the drawings, and with chamber 16 maintained under vacuum pressure, shuttle valve 31 will be moved to the position shown in Figure 6 by differential air pressure due to air at atmosphere pressure being supplied through ports 74', 44', groove 34' and port 33' to bore 30; while the sub-atmospheric pressure in chamber 16 will be maintained at the opposite end of shuttle valve 31 through medium of passage 70, port 73, groove 71, port 44, groove 34 and port 33. With the shuttle valve 31 in this position air at atmospheric pressure will be supplied to piston chamber 55 through ports 38', 37', bore 30, port 35', groove 37' and passages 49 and 49'; while piston chamber 56 will be subjected to sub-atmospheric pressure through medium of passages 47, 47', groove 46, port 35, bore 30, port 29, groove 24, passage 23, bore 19 and nipple 18. This application of differential air pressure on the duplex piston 58 will cause said piston to move toward the outer end of piston chamber 56, thus causing valve 63 to connect port 73 with port 44', open port 34 to atmosphere and thereby reverse the application of differential air pressure on shuttle valve 31. This causes the shuttle valve to move to its second position and thereby effect the return of duplex piston 58 and valve 63 to their first positions.

When valve 63 is in the position shown in Figure 9 the teat cups will be subjected to the vacuum pressure in chamber 16 through the medium of passages 70 and 66, recess 64, passages 65, 67 and nipple 68. When valve 63 is moved to its second position the teat cups will be shut off from the influence of the sub-atmospheric pressure in chamber 16 and be subjected to atmospheric pressure due to passage 65 being shut off from communication with passage 66 and opened to the atmosphere by valve 63.

As used, the term "fluid" means the liquid, vapor, or gaseous state of milk, air, or other material.

Although the invention has been described with particularity to detail, it is not the intention, unless otherwise indicated in the claim, to limit the invention here shown for purpose of illustration.

I claim:

A pulsator for a milking apparatus, comprising a body member having a closed connection with a source of vacuum and a closed connection with a set of teat cups, air conduit means adapted to alternately connect the teat cups with a source of vacuum and with the atmosphere; said air conduit means comprising piston means mounted for reciprocative movement, a slide valve carried by the said piston means having sliding contact with the body member, the movement of said slide valve alternately connecting said teat cups with a source of vacuum and a source of atmosphere; fluid-conveying means including a shuttle valve mechanism mounted within the body member for alternately subjecting opposite sides of the piston means to atmospheric and vacuum pressures thus actuating said slide valve, and separate air conveying means in said body controlled by said slide valve for alternately subjecting opposite ends of the shuttle valve to vacuum and to atmospheric pressures whereby said shuttle valve is actuated at a predetermined position of the piston means for producing reciprocation of said piston means.

References Cited in the file of this patent

UNITED STATES PATENTS

| Number | Name | Date |
|---|---|---|
| 875,706 | Good | Jan. 7, 1908 |
| 2,489,563 | Dinesen | Nov. 29, 1949 |